United States Patent [19]

Perlman et al.

[11] Patent Number: 5,119,064
[45] Date of Patent: * Jun. 2, 1992

[54] HOOD ORNAMENT ALARM ACTUATOR

[76] Inventors: Marvin K. Perlman; Richard F. Perlman, both of 2311 Moreno Blvd., San Diego, Calif. 92110

[ * ] Notice: The portion of the term of this patent subsequent to Nov. 21, 2006 has been disclaimed.

[21] Appl. No.: 603,152

[22] Filed: Oct. 25, 1990

Related U.S. Application Data

[63] Continuation-in-part of Ser. No. 444,989, Dec. 4, 1989, Pat. No. 4,994,785.

[51] Int. Cl.$^5$ .............................................. B60Q 1/00
[52] U.S. Cl. ................................. 340/426; 307/10.2; 340/568
[58] Field of Search ................... 340/425.5, 426, 429, 340/438, 568; 307/10.2; 24/3 R, 6, 49 CP, 356, 363, 458, 706.3, 707.6, 13, 368, 103; 40/1.5, 1.6, 591, 659

[56] References Cited

U.S. PATENT DOCUMENTS

| | | | |
|---|---|---|---|
| 3,134,151 | 5/1964 | Conlin | 24/6 |
| 4,315,244 | 2/1982 | Cole, Jr. | 340/427 |
| 4,882,563 | 11/1989 | Perlman et al. | 340/426 |
| 4,994,785 | 2/1991 | Perlman et al. | 340/426 |

Primary Examiner—Jin F. Ng
Assistant Examiner—Brent A. Swarthout

[57] ABSTRACT

A theft alarm actuator is provided for an alarm system for a hood ornament, utilizing a pair of spaced insulating plugs held apart by a coil spring and retained together by the long end of a safety pin-like clip which engages a detent in the hood ornament element, and has a long leg which passes down thrugh the plugs, with a nut engaged on the threaded end of the long leg beneath the lower contact such that deflection of the hood ornament element raises the clip, bringing the contacts, which are mounted on the plugs, together to actuate the alarm. The alarm itself is not part of the invention, and could be any electrically-operated unit actuated by closing the circuit.

9 Claims, 1 Drawing Sheet

HOOD ORNAMENT ALARM ACTUATOR

BACKGROUND OF THE INVENTION

This application is a continuation-in-part of application Ser. No. 07/444,989, filed Dec. 4, 1989, now U.S. Pat. No. 4,994,785 for a HOOD ORNAMENT ALARM invented by Marvin K. Perlman and Richard S. Perlman.

Fancy hood ornaments, most notably on "CADILLACS" and "MERCEDES BENZ" automobiles, seat in shallow sockets defined in the hood, and are retained by elastic means that engage the hood ornament and pass through an aperture in the hood and are retained on the underside of the hood. If they are struck by anything, as they inevitably are over the life of the car, rather than break off, because of the resilient mounting they just deflect and snap back upright when the deflecting force abates.

This works well when the ornament is struck. However, this mounting system does not work well in preventing theft of the hood ornament. Although perhaps only a few years ago hood ornament theft was generally unknown, increasingly, whether for reasons of monetary gain, resentment, thrills, or for personal motives, thieves are taking hood ornaments. Such thievery puts the owners not only to the cost of replacing the ornament, but to the nuisance of having to go the dealership or other source and take the time to secure another ornament and install it.

Applicants have provided a solution to this problem in a previous patent, U.S. Pat. No. 4,882,563 issued Nov. 21, 1989, on an HOOD ORNAMENT THEFT ALARM. A second patent has been allowed on a HOOD ORNAMENT ALARM, which is referenced above, and will issue in due course.

Both of the inventions set forth in the above referenced patents do a very good job, and the inventors have been successful in commercializing the theft alarms and have in fact sold several thousand to date. However, as with almost anything, the invention as set forth in the above-referenced disclosures are subject to improvements.

Most notably, because a great many of these alarms are installed at the point of purchase, that is, at the automobile dealerships, someone at the dealership must install quite a number of these alarms in any given time period. For this reason, it is important that the alarm be as simple and fool-proof to install as is reasonably possible. Whereas an individual might be quite happy spending an hour or two installing even the most complicated hood ornament alarm system, an on-site dealership mechanic is going to want to deal with ornament alarms that represent the absolute minimum in time commitment and maximum ease and simplicity of assembly.

The invention of the first two disclosures, in particular, utilized a hook connector structure which connected the hood ornament element itself to the lowermost electrical contact plug, which would require engaging the hook first around the ornament bar, and then down through the hood to engage a separate member which passes through the lower contact plug. Although this system was reasonably easy to use, parts of the assembly were nevertheless tedious and frustrating, at times, prompting a typical mechanic to wish he had three hands.

There is a need for a modified alarm actuator system which is easier to install than the ones currently and previously sold, a system which would make life even easier on the typical overworked and under appreciated automobile mechanic.

SUMMARY OF THE INVENTION

The instant invention fulfills the above stated need by replacing the two-ended hook of the prior two inventions with a safety pin-like clip having an upper portion which loops through the crossbar in the hood ornament element, and a lower portion that extends down through the lower contact-mounting plug, at which point it is threaded and receives a retainer nut. Thus, this clip is very simply engaged over the hood element and threaded down through the rest of the system, being threaded through the top and bottom plug, and then secured with a retainer nut. Retainer nut detent structure allows the sensitivity of the actuator to be adjusted with infinite precision, and no tedious insertion of a hook through a confined member must be done on-site.

The clip is initially passed through the hood ornament bar before it is mounted on the hood, with the clip engaged on itself to prevent the hood element from coming off. It is then very simple to insert the long leg of the clip through the remaining structure of the actuator.

An additional improvement comprises a pair of guide bars defined integrally with one of the plugs, which passed through integrally defined guide sockets on the other of the plugs.

DETAILED DESCRIPTION OF THE PREFERRED EMBODIMENT

Figure 1:
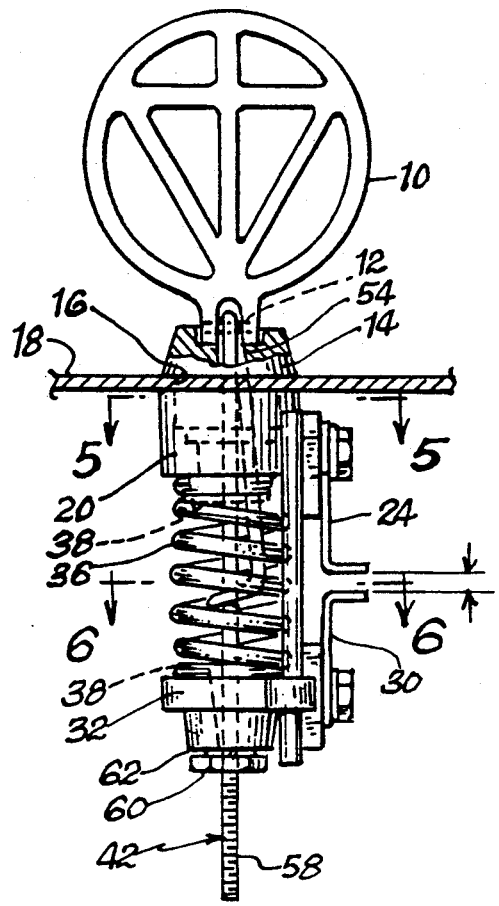
FIG. 1 is an elevation view of the complete actuator as it would appear mounted on a hood and to a hood element.
Figure 7:
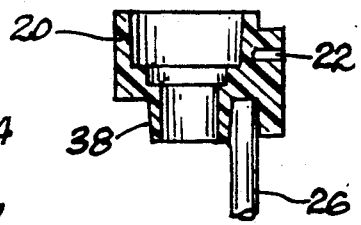
FIG. 7 is a section taken along line 7—7 of FIG. 5 before the metal contact element has been attached.
Figure 6:
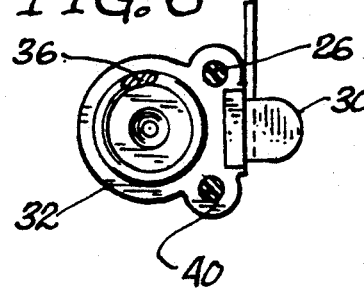
FIG. 6 is a section taken along line 6—6 of FIG. 1.
Figure 8:
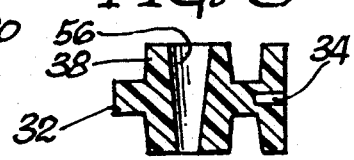
FIG. 8 is a section taken along line 8—8 of FIG. 6 before the metal contact has been attached.

The complete assembly is shown in FIG. 1. It consists of a hood ornament element 10 which has retainer crossbar 12, and rests in a socket 14 which fits in a hole 16 in the vehicle hood 18. Just beneath the socket is a preferably mating plug 20 configured as shown in FIG. 7, so that it fits snugly against the bottom surfaces of the socket. The plug 20 has a self-tapping screw bore 22 for the attachment of the metal contact element 24. The plug also defines depending guide rods 26 which are preferably molded integrally with the plug 20, but could also be bonded to the plug as a separate pair of elements. The contact element 24 is stationary, as is the plug 20.

A movable contact element 30 is fastened to the moving plug 32 by means of a screw engaged in the self-tapping screw hole 34 of the second plug 32. The plugs compress a coil spring 36 therebetween, and each plug has a conical boss 38 to securely seat the spring. The lower plug 32 also defines guide sockets 40 to seat in sliding relation the guide rods 26, preserving the plugs non-rotationally relative to one another, so that they can experience only axial motion.

The contacts 24 and 30 must, of course, be wired into an alarm system to be of any use. However, the alarm system itself is not part of this invention, and any alarm which depends on the completion of an electrical circuit to be actuated would work. The contacts are shown as having male spade terminals to fit the female terminals of wires from the circuit of the alarm system.

Figure 2:
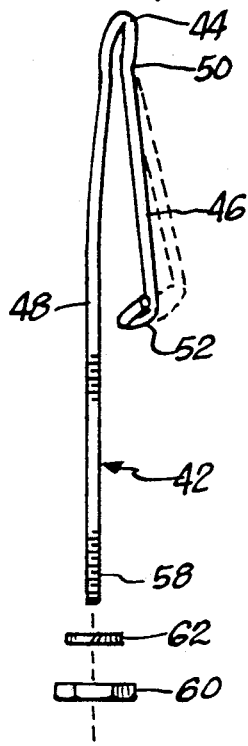
FIG. 2 illustrates the connector clip in isolation.
Figure 3:
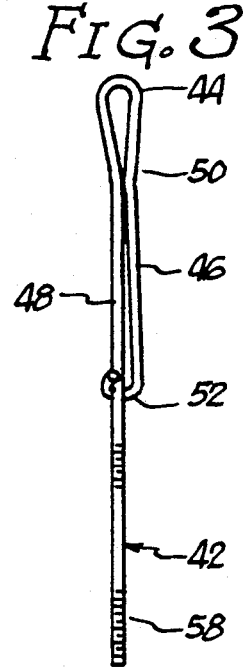
FIG. 3 is an end elevation view of the retainer clip in its self-engaging configuration.
Figure 4:
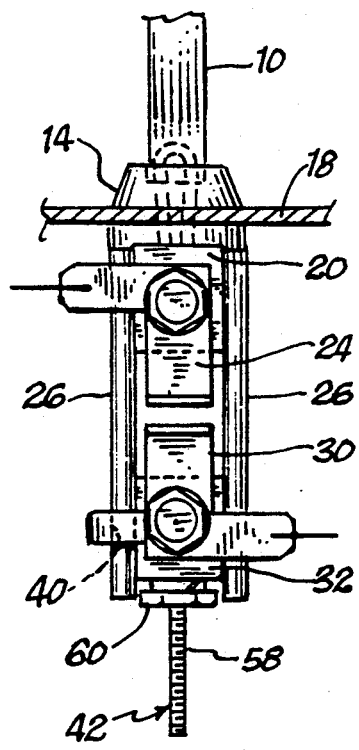
FIG. 4 is a side elevation view of the body of the actuator as seen in FIG. 1.
Figure 5:
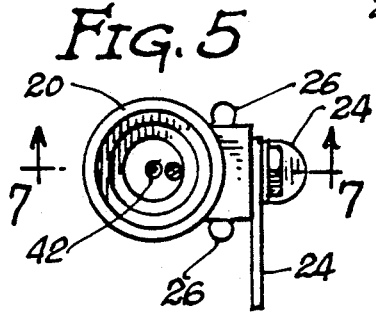
FIG. 5 is a section taken along line 5—5 of FIG. 1.

The clip, which is central to the invention, is shown in its relaxed configuration in FIG. 2 at 42. It is somewhat safety pin-like, having a bend 44, a short leg 46 descending from one side of the bend and a long leg 48 descending from the other side of the bend. Right adjacent the bend there is a constricted neck area 50 to facilitate insertion of the double thickness of the clip near the top bend through the pass-through aperture of the socket 14. The clip is made of a resilient spring metal, more malleable than piano wire but sufficiently resilient to have a substantially permanent memory. The clip is hooked over the crossbar 12 of the hood ornament as shown in FIG. 1, with the loop 52 at the bottom of the short leg looped around the long leg as shown in FIG. 3. In this configuration, also shown in FIG. 1, the resilience of the clip will perpetually hold the two legs together, forming a tight enough configuration to pass through the central opening 54 in the socket. The loop 52 is downwardly canted to facilitate insertion of the clip through the ornament socket, which defines a restricted passageway.

Once the ornament has been engaged, the clip is in fact passed down through the socket 14, with the lower end passing into the conical guide-like aperture 56 in the movable plug. The lower end of the long leg of the clip is threaded as indicated at 58, and a nut 60 is engaged with a washer 62 over the end of the long leg of the clip to retain the lower plug in place and also to adjustably compress the lower plug up toward the upper plug. This adjustment of course brings the contacts closer together, so the nut creates a sensitivity adjustment.

The configuration of the clip 42 of the other structure of the actuator is such that it can be assembled without compressing the coil spring 36, and then the spring is compressed by tightening the nut 60. This is a major advantage in that the spring is a rather high-compression spring, and otherwise the mechanic is required to forcibly squeeze the two parts together while trying to engage the nut. Once securely installed, the end of the long leg 48 can be snipped off if desired, to prevent tearing clothing, etc.

The instant invention represents a significant advance in the art in which commercial viability more than high technology generally reigns king. The commercial advantage of using the simple safety pin-like clip to mount the structure together produces a substantial competitive advantage. Applicants' products, which now lead the industry, will remain firmly situated in that position in the foreseeable future through use of the improved and simplified clip and its associated actuator apparatus.

It is hereby claimed:

1. A theft alarm actuator for a hood ornament which mounts in a socket mounted on a vehicle hood, there being a pass-through opening in said socket and said hood ornament having a detent member engagable by a hook to hold same down in said socket, said actuator comprising:
   (a) a stationary contact mounted adjacent and beneath said socket;
   (b) a moving contact, below, and having means biasing same away from, said stationary contact; and,
   (c) a substantially U-shaped clip having a U-shaped bend looped through said detent member, a long leg extending down from one side of said bend having means to engage said moving contact, and a short leg extended down from the other side of said bend and terminating in a loop which positively engages said long leg to secure said clip in place, such that deflection of said hood ornament raises said clip, bringing said contacts together to actuate an alarm.

2. Structure according to claim 1 wherein said clip is fabricated from a spring metal, and said short leg and loop are configured and dimensioned such that said loop snaps around said long leg to positively retain said clip in place.

3. Structure according to claim 1 wherein said clip defines a convergent neck where said legs bend together adjacent said bend to expedite the insertion of said long leg and short leg through the pass-through in said socket.

4. Structure according to claim 1 wherein said long leg passes through said moving contact and said means to engage said moving contact comprises a retainer therebelow to engage said moving contact.

5. Structure according to claim 4 wherein the end of said long leg is threaded and said retainer is a nut threadedly engaged on said leg.

6. Structure according to claim 5 wherein said contacts each include a plug with a bore therethrough passing said long leg therethrough, and said means biasing said moving contact comprises a coil spring captured between said plugs on said long leg.

7. A theft alarm actuator for a hood ornament which mounts in a socket mounted on a vehicle hood, there being a pass-through opening in said socket and said hood ornament having a detent member engagable by a hook to hold same down in said socket, said actuator comprising:
   (a) a stationary contact mounted adjacent and beneath said socket;
   (b) a moving contact, below, and having means biasing same away from, said stationary contact; and,
   (c) a substantially U-shaped clip having a U-shaped bend looped through said detent member, a long leg extending down from one side of said bend with means to engage said moving contact, and a short leg extended down from the other side of said bend and terminating in a loop which positively engages said long leg to secure said clip in place, such that deflection of said hood ornament raises said clip, bringing said contacts together to actuate an alarm;
   (d) said long leg passing through said moving contact and said means to engage said moving contact comprising a retainer therebelow to engage said moving contact;
   (e) the end of said long leg being threaded and said retainer being a nut threadedly engaged on said leg;
   (f) said contacts each including a plug with a bore therethrough passing said long leg therethrough, and said means biasing said moving contact comprising a coil spring captured between said plugs on said long leg; and,
   (g) one of said plugs mounting at least one guide channel and the other of said plugs mounting at least one rigid guide rod slidably seated in said guide channel to maintain said contacts mutually non-rotational around said leg.

8. Structure according to claim 7 wherein said at least one channel is two in number and said at least one rod comprises two rods sliding in the respective two channels.

9. Structure according to claim 1 wherein said loop at the end of said short leg is slanted downwardly in its installed orientation to facilitate insertion thereof through the pass-through opening in said socket.

* * * * *